(12) United States Patent
Mizoguchi et al.

(10) Patent No.: US 11,843,754 B2
(45) Date of Patent: Dec. 12, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Yoshinori Mizoguchi, Tokyo (JP); Takahisa Akaishi, Kanagawa (JP); Yoshinori Kawai, Chiba (JP); Kouta Murasawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 17/592,203

(22) Filed: Feb. 3, 2022

(65) Prior Publication Data

US 2022/0250394 A1 Aug. 11, 2022

(30) Foreign Application Priority Data

Feb. 9, 2021 (JP) .................................. 2021-019161

(51) Int. Cl.
| | |
|---|---|
| *H04N 1/60* | (2006.01) |
| *H04N 1/00* | (2006.01) |
| *H04N 1/54* | (2006.01) |
| *B41J 2/21* | (2006.01) |

(52) U.S. Cl.
CPC ............ *H04N 1/6008* (2013.01); *H04N 1/00* (2013.01); *H04N 1/54* (2013.01); *B41J 2/2103* (2013.01)

(58) Field of Classification Search
None
See application file for complete search history.

(56) References Cited

U.S. PATENT DOCUMENTS

| | | | | |
|---|---|---|---|---|
| 5,028,991 A | * | 7/1991 | Sekizawa | ................. H04N 1/58 358/537 |
| 5,136,401 A | * | 8/1992 | Yamamoto | ............... H04N 1/38 358/518 |
| 2014/0320927 A1 | * | 10/2014 | Kuo | .......................... H04N 1/54 358/2.1 |
| 2017/0247560 A1 | * | 8/2017 | Watanabe | .................. B41J 2/21 |

FOREIGN PATENT DOCUMENTS

JP  2012186711 A  9/2012

\* cited by examiner

*Primary Examiner* — Lennin R Rodriguezgonzalez
(74) *Attorney, Agent, or Firm* — Canon U.S.A., Inc. IP Division

(57) ABSTRACT

When an image is recorded using an ink of a basic color and an ink of a specific color, if an amount of ink applied to a recording medium exceeds an amount receivable by the recording medium, the ink overflows and image quality deteriorates. At this time, ink overflowing can be prevented by reducing an application amount of ink, but color balance may vary. By preferentially reducing an application amount of the ink of the specific color among inks of a plurality of colors that are to be applied to a recording medium, a change in the color balance is suppressed and the ink overflowing is prevented.

20 Claims, 16 Drawing Sheets

FIG.2
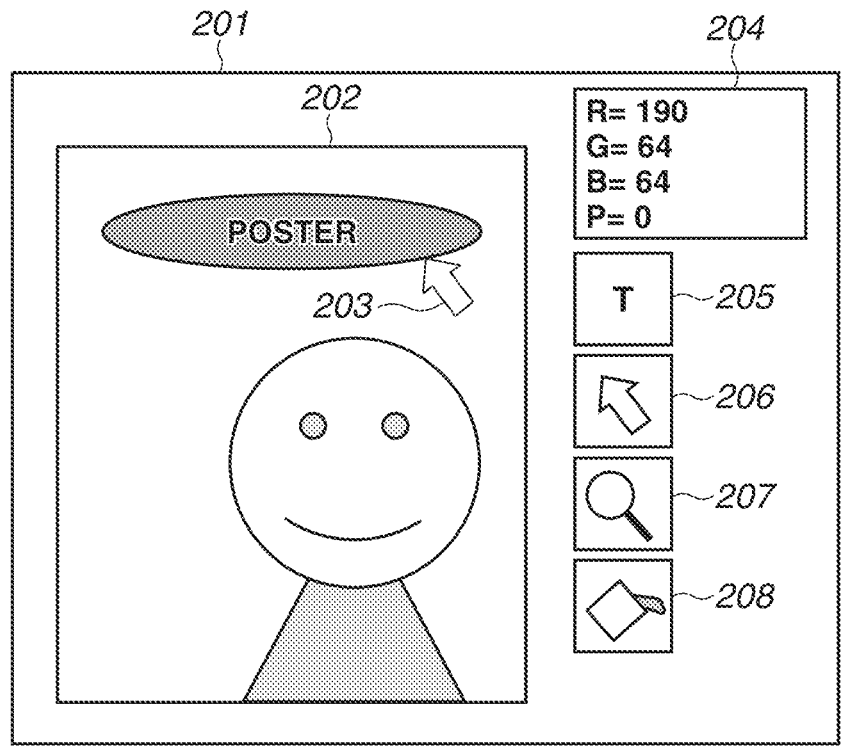
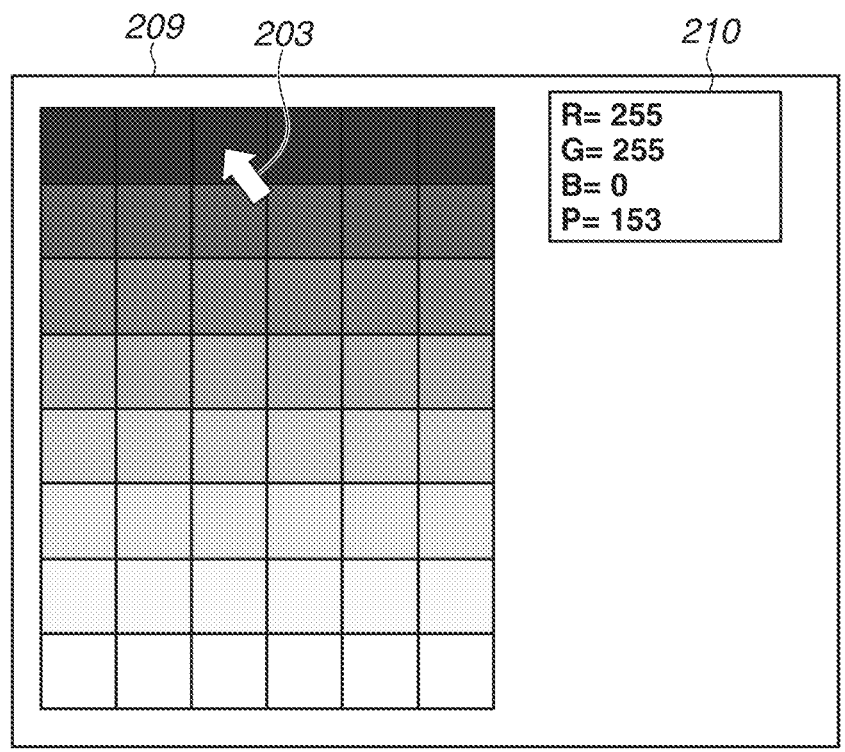

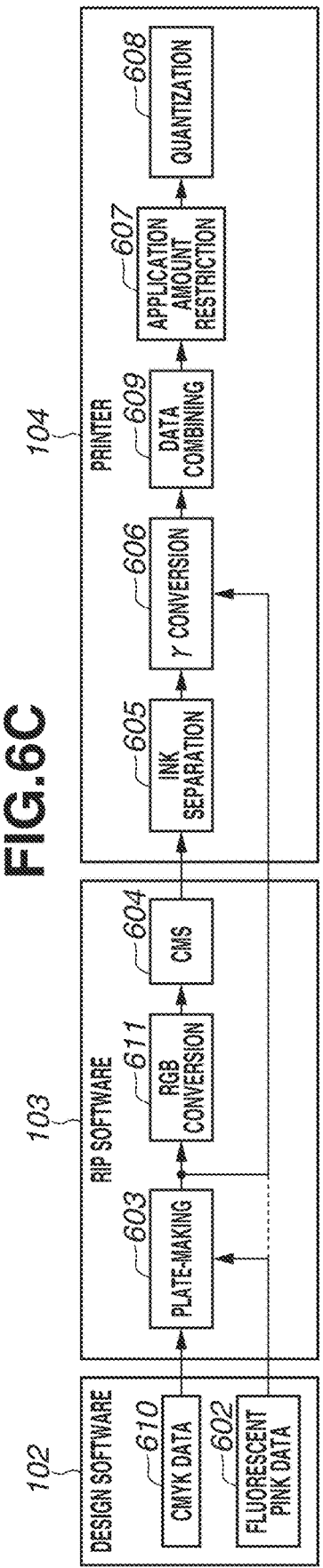
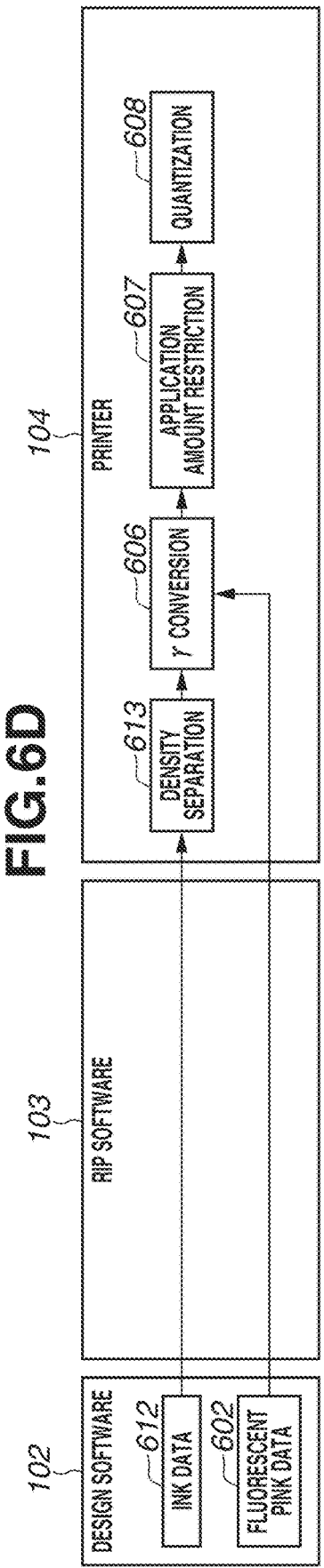

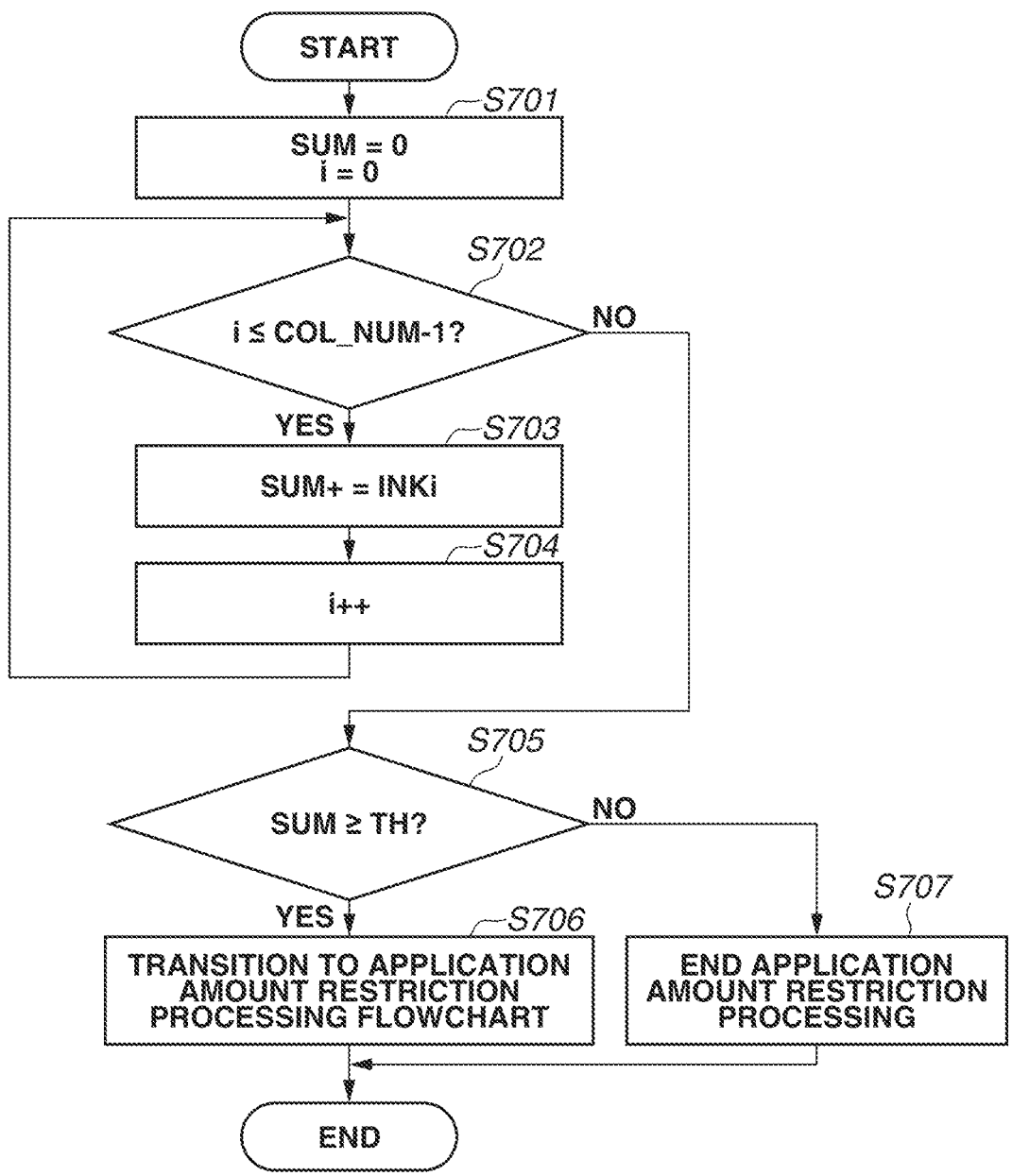

FIG.8

| INK ID | INK NAME | APPLICATION AMOUNT | FLUORESCENT DETERMINATION |
|---|---|---|---|
| 0 | CYAN INK | 250 | FALSE |
| 1 | MAGENTA INK | 160 | FALSE |
| 2 | YELLOW INK | 170 | FALSE |
| 3 | BLACK INK | 180 | FALSE |
| 4 | FLUORESCENT PINK INK | 255 | TRUE |

FIG.12

| INPUT | | | OUTPUT | | | | |
|---|---|---|---|---|---|---|---|
| R | G | B | C | M | Y | K | SUM |
| 0 | 0 | 0 | 0 | 0 | 0 | 255 | 255 |
| 0 | 0 | 64 | 220 | 220 | 250 | 100 | 790 |
| 0 | 0 | 128 | 240 | 220 | 130 | 5 | 595 |
| 0 | 0 | 255 | 240 | 190 | 0 | 0 | 430 |
| 0 | 64 | 0 | 220 | 155 | 240 | 110 | 725 |
| ⋮ | ⋮ | ⋮ | ⋮ | ⋮ | ⋮ | ⋮ | ⋮ |
| 255 | 255 | 255 | 0 | 0 | 0 | 0 | 0 |

FIG.14

| INPUT | | | OUTPUT | | | | | |
|---|---|---|---|---|---|---|---|---|
| R | G | B | C | M | Y | K | FLUORESCENT PINK | SUM |
| 0 | 0 | 0 | 0 | 0 | 0 | 255 | 0 | 255 |
| 0 | 0 | 64 | 220 | 100 | 250 | 100 | 120 | 670 |
| 0 | 0 | 128 | 240 | 100 | 130 | 5 | 120 | 475 |
| 0 | 0 | 255 | 240 | 85 | 0 | 0 | 105 | 325 |
| 0 | 64 | 0 | 220 | 85 | 240 | 110 | 90 | 655 |
| ... | ... | ... | ... | ... | ... | ... | ... | ... |
| 255 | 255 | 255 | 0 | 0 | 0 | 0 | 0 | 0 |

IMAGE PROCESSING APPARATUS, IMAGE PROCESSING METHOD, AND STORAGE MEDIUM

BACKGROUND

Field of the Disclosure

The present disclosure relates to an image processing apparatus for recording an image onto a recording medium, an image processing method, and a storage medium.

Description of the Related Art

In recent years, users using recording apparatuses (printers) have become increasingly fragmented. Users accustomed to the use of recording apparatuses record a test patch on a recording medium and adjust an ink application amount by themselves. On the other hand, to unaccustomed users, a conversion table for adjusting an ink application amount is provided by a printer vendor knowledgeable about characteristics of recording apparatuses and ink. By using such a conversion table, the unaccustomed users can adjust tint within a range of an application amount in such a manner that an ink application amount on a recording medium does not become too much.

In a case where the conversion table is used, an ink ratio in a secondary color image reproduced using inks of a plurality of colors is selected from a range provided by the printer vendor. On the other hand, there is an increasing demand for setting an application amount of each ink color at a ratio different from the ink ratio provided in the conversion table.

Japanese Patent Application Laid-Open No. 2012-186711 discusses calculating a total value of ink application amounts, and restricting the ink application amounts in such a manner that the total value becomes smaller than or equal to a preset limit value, to reduce a load of designing a look-up table.

By executing the application amount restriction processing discussed in Japanese Patent Application Laid-Open No. 2012-186711, the total value of application amounts of inks applied to a recording medium becomes smaller than or equal to the limit value, and overflowing can be prevented. On the other hand, a change in an ink ratio can drastically change the tint of a recorded product.

SUMMARY

According to embodiments of the present disclosure, an image processing apparatus includes an acquisition unit configured to acquire a color signal including a plurality of elements indicating application amounts of inks of a plurality of colors, the inks including at least one ink of a basic color and a fluorescent ink containing dispersion having a fluorescent property, to record an image by applying the inks of the plurality of colors to a recording medium, a determination unit configured to determine whether a total value of the plurality of elements included in the color signal is larger than a threshold value, and a reduction unit configured to reduce a value of at least one element of the plurality of elements included in the color signal in such a manner that the total value obtained after reduction becomes smaller than the total value is determined to be larger than the threshold value, wherein, in reduction processing performed by the reduction unit, an amount by which a value of an element corresponding to the fluorescent ink is reduced is largest among amounts by which respective values of the plurality of elements included in the color signal are reduced.

Further features of the present disclosure will become apparent from the following description of exemplary embodiments with reference to the attached drawings.

BRIEF DESCRIPTION OF THE DRAWINGS

FIG. 2 is a diagram illustrating an example of user interface (UI) information of design software.

FIGS. 6A, 6B, 6C, and 6D are diagrams each illustrating an example of processing configuration of the recording system.

FIG. 7 is an application amount exceedance determination processing flowchart according to a first exemplary embodiment.

FIG. 8 illustrates a table indicating a correspondence relationship between an ink ID, an ink name, and an application amount with respect to a certain pixel.

FIG. 12 illustrates an example of a look-up table to be used in ink separation.

FIG. 14 illustrates an example of a look-up table to be used in ink separation.

DESCRIPTION OF THE EMBODIMENTS

Hereinafter, exemplary embodiments of the present disclosure will be described with reference to the drawings.

Figure 1:
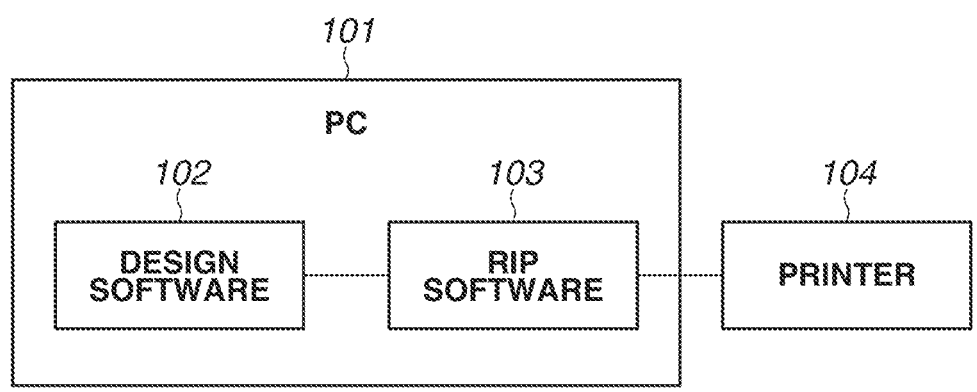
FIG. 1 is a diagram illustrating an example of a schematic overview of a recording system.

FIG. 1 illustrates an example of a recording system applicable to a first exemplary embodiment. A printer 104 functioning as an image processing apparatus is connected with a personal computer (PC) 101. In the PC 101, design software 102 can be activated to edit image data to be recorded by the printer 104. The image data created by the design software 102 is transferred to raster image processor (RIP) software 103. In the RIP software 103, plate-making processing and color management processing are executed.

FIG. 1 illustrates an example in which the design software 102 and the RIP software 103 are activated in the PC 101, but the design software 102 and the RIP software 103 may be activated in another PC. In many cases, a user who creates and edits image data is different from a user who executes editing for performing recording on a recording medium. In such cases, RIP software and a printer are executed in a PC of a printing business operator. The design software 102 may be Illustrator or dedicated software for a specific model, for example, and the software is not limited. The design software 102 and the RIP software 103 may be integrally formed. Alternatively, the RIP software 103 may be incorporated into the printer 104. Various communication configurations such as universal serial bus (USB) connection and Gigabit-Ethernet connection being wired connection, and Wireless Fidelity (Wi-Fi) connection being wireless connection can be applied to communication between the PC 101 and the printer 104. Because a communication configuration affects the productivity of a printer, it is desirable that a communication configuration can be selected to suit the productivity of a printer desired by a user.

FIG. 2 illustrates an example of a user interface (UI) of the design software 102. In FIG. 2, a screen 201 represents an entire screen on which image data is to be edited. Image data 202 is image data to be edited displayed thereon, and includes a signal value of P indicating fluorescent pink in addition to signal values of R, G, and B. In FIG. 2, the image data 202 includes a layer of (R, G, B, P) drawing a face of a human, and a layer of (R, G, B, P) of a words balloon containing a text "POSTER" therein. A pointer 203 is a pointer to be operated on a window by a user handling a mouse to edit image data using the design software 102. Pixel values 204 are pixel values of data pointed by the pointer 203. In the example illustrated in FIG. 2, the pointer 203 points to the words balloon containing the text "POSTER" on the image data 202. As the pixel values of the words balloon, signal values of (R, G, B, P) are (190, 64, 64, 0).

A text edit button 205 is a button for superimposing text data on image data 202 in editing using the design software 102. For example, a text "POSTER" can be added on the image data 202, and the text can be changed. A mouse change button 206 is a button for changing the pointer 203 to another pointer. For example, the pointer 203 can be changed to a rectangular frame for designating a region of the entire words balloon. An enlarge/reduce button 207 is a button for enlarging or reducing displayed information on the image data 202. A color change button 208 is a button to change pixel value information of data pointed to by the pointer 203. If the color change button 208 is pressed, a swatch screen 209 is displayed by screen transition or as another screen.

If the pointer 203 designates a patch from the swatch screen 209, pixel values 210 corresponding to the patch are displayed. In FIG. 2, signal values of (R, G, B, P) of the patch designated by the pointer 203 are (255, 255, 0, 153).

The pixel value information obtained as the pixel values 204 and the pixel values 210 is not limited to (R, G, B, P). For example, the pixel value information may be a color signal including elements of (C, M, Y, K, P). Alternatively, the pixel value information may be a color signal including elements of (C, Lc, M, Lm, Y, Ly, K, Lk, P). In the case of information other than R, G, or B, a given pixel value is sometimes associated with density on a recording medium. Patches in the swatch screen 209 illustrated in FIG. 2 are cross patches each having a signal value of P (fluorescent pink) changing along a horizontal axis and signal values of R, G, and B changing along a vertical axis. However, a patch display method is not limited to such a patch display method. As the pixel value information indicated by the pixel values 210, designated values can be manually set by the user. In a case where the use frequency of pixel values manually set by the user is high, the pixel values can also be preset in the swatch.

The above-described representation method using the swatch can be used as a method by which the user designates the density of fluorescent pink, but the user can also directly designate a numerical value.

The design software 102 transmits created image data 202 to the RIP software 103. In the example illustrated in FIG. 2, the created image data 202 includes data corresponding to four colors of R, G, B, and P. Two or more pieces of image data can be created using the design software 102, and the two or more pieces of image data can be transmitted to the RIP software 103. On the image data 202, a region indicated with "POSTER" is supposed to be superimposed on a background including the face of a human. In this case, image data including the face of the human and image data indicated with "POSTER" are both transmitted to the RIP software 103. In the RIP software 103, the plurality of pieces of transmitted image data is subjected to plate-making, and a single piece of image data is transferred to the printer 104.

Figure 3:
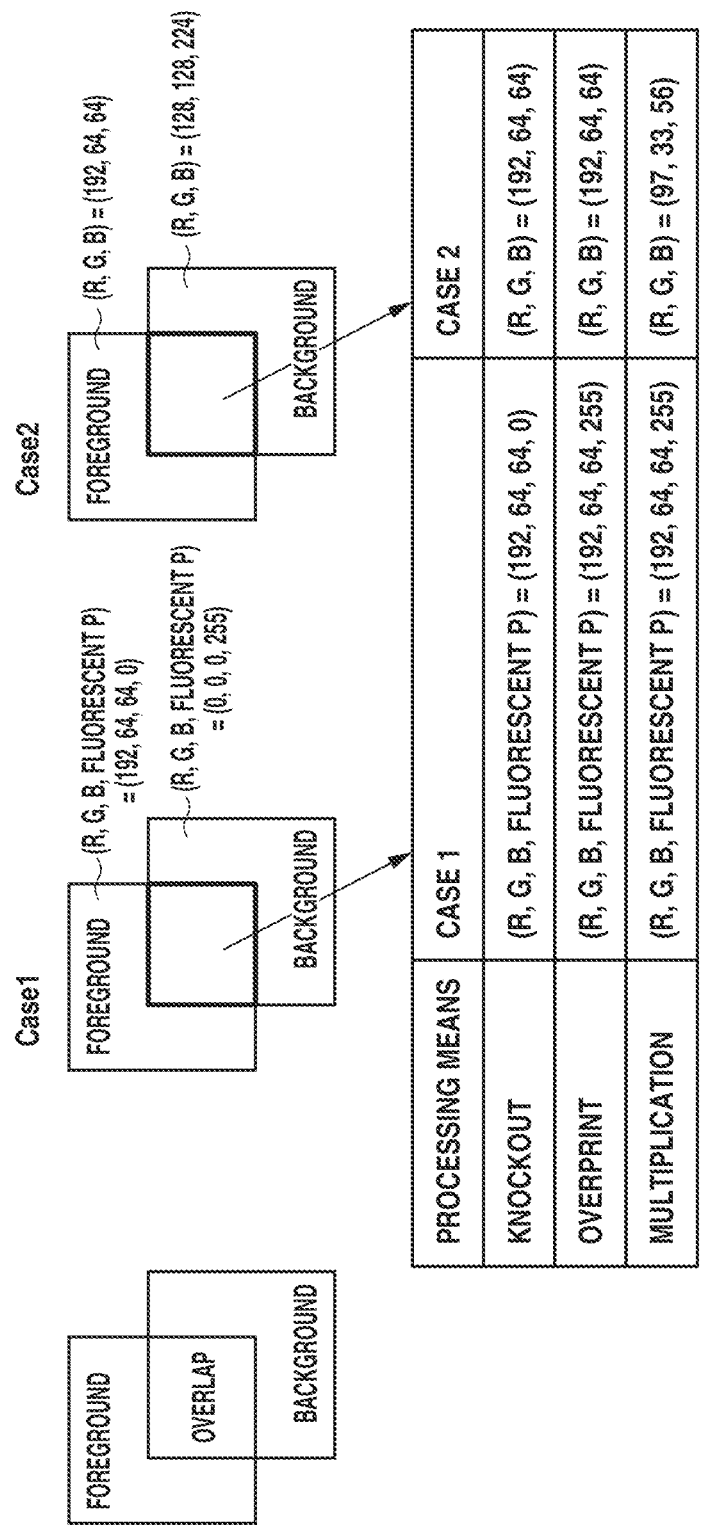
FIG. 3 is a diagram illustrating an example of plate-making processing to be executed in raster image processor (RIP) software.

FIG. 3 illustrates an example of plate-making performed on data input to the RIP software 103. By the plate-making processing, a single piece of image data of (R, G, B, P) is generated from a plurality of layers. In the plate-making processing, three types of processing, namely, "knockout", "overprint", and "multiplication", are mainly considered. FIG. 3 illustrates practical examples of plate-making processing in two cases. In Case 1, RGB data and fluorescent pink data are input. In Case 2, two types of RGB data are input so that a change in an execution unit of the plate-making processing can be easily understood.

The knockout prioritizes foreground data in the case of overlap in all image planes. In Case 1, if a signal value of fluorescent pink in the foreground data is 0, even if a signal value thereof in background data is 255, a signal value thereof in the overlap region is output as 0. The user selects the knockout, for example, for the purpose of displaying the foreground data.

While prioritizing the foreground data in the case of overlap, the overprint employs the background data in a case where a signal value in an image plane of the foreground data is 0. In Case 1, since a signal value of fluorescent pink in the foreground data is 0, a signal value 255 of the background data is employed as an output value of the overlap region. The user selects the overprint, for example, for the purpose of preventing misregistration.

In the case of overlap, the multiplication employs signal values of the foreground data and the background data using a determined formula. The formula varies depending on software. For example, an output result illustrated in FIG. 3 is calculated using the following formula 1.

$$\text{Output signal value} = (1 \times \text{foreground data}) \times (1 \times \text{background data})/255 \qquad (1)$$

The user selects the multiplication, for example, for the purpose of obtaining a watermark effect.

The overprint and the multiplication are employed with intent to make use of the background data without overwriting the background data with the foreground data. For example, the overprint and the multiplication are effective in a case where a luminous effect of fluorescent pink ink obtained from fluorescent pink data is also desired to be obtained in addition to gradation characteristics of color inks.

Figure 4:
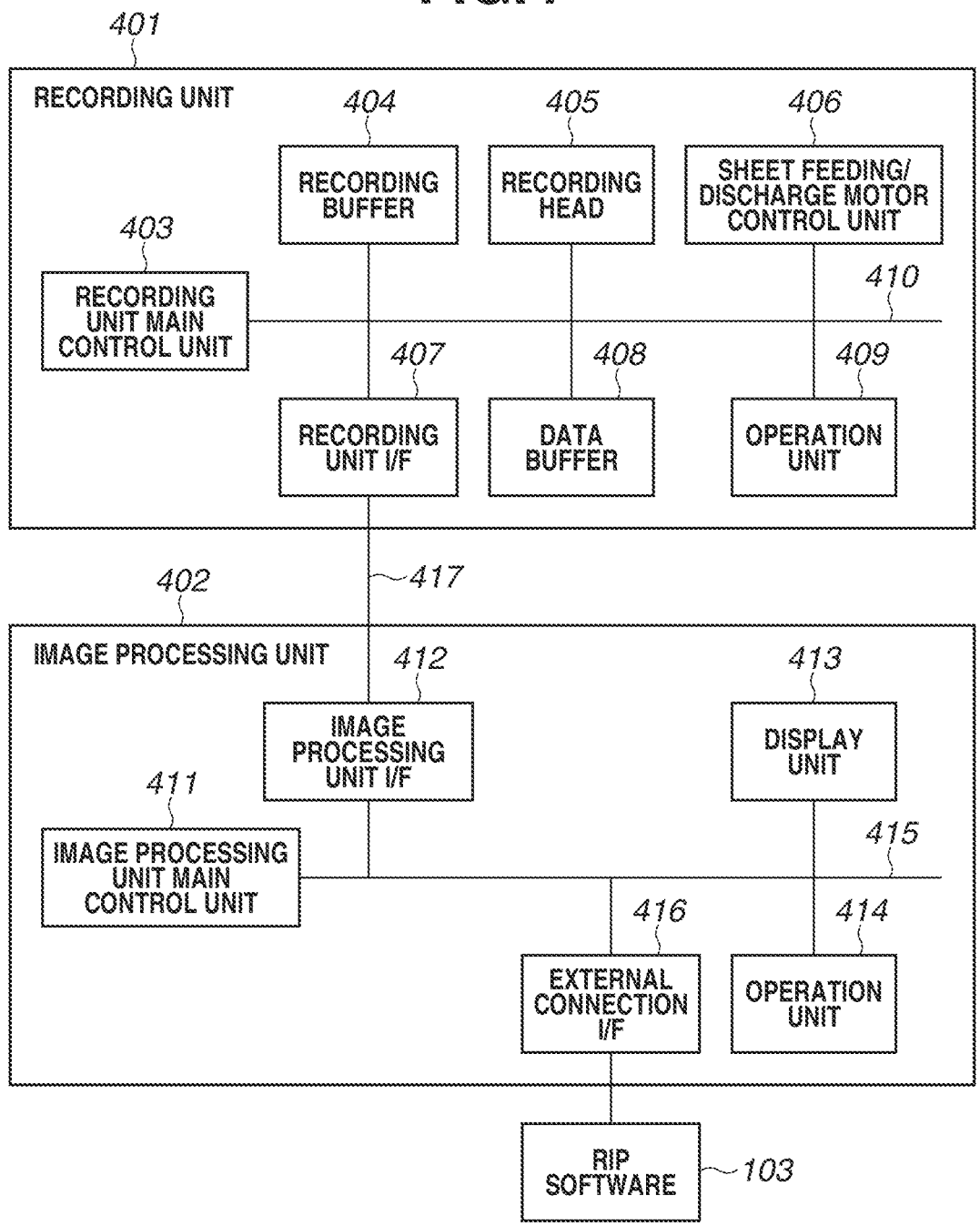
FIG. 4 is a block diagram illustrating a control configuration of an inkjet recording system.

FIG. 4 is a block diagram illustrating an example of a configuration of the printer 104. The printer 104 according to the present exemplary embodiment includes a recording unit 401 and an image processing unit 402. After being subjected to predetermined image processing in the image processing unit 402, image data supplied from the RIP software 103 is transmitted to and recorded in the recording unit 401.

In the recording unit 401, a recording unit main control unit 403 controls the entire recording unit 401, and includes a central processing unit (CPU), a read-only memory (ROM), and a random access memory (RAM). Because the CPU constituting part of a control unit can operate a hardware circuit of an application specific integrated circuit (ASIC), the ASIC may be included as a component. A recording buffer 404 can store image data to be transferred to a recording head 405 as raster data. The recording head 405 is an inkjet-type recording head including a plurality of nozzles that can discharge ink as droplets. Based on image data stored in the recording buffer 404, the recording head 405 discharges ink from each nozzle. In the present exemplary embodiment, five nozzle arrays respectively corresponding to inks of five colors in total, namely, cyan (C) ink, magenta (M) ink, yellow (Y) ink, and black (K) ink, as inks of basic color and fluorescent pink (P) ink as an ink of specific color are arranged on the recording head 405. The number of ink colors is not limited to five, and basic colors are not limited to the above-described colors. A nozzle array that discharges any one of light cyan ink, light magenta ink, and gray ink, for example, as a basic color ink may be further included. In addition, a nozzle array for any one of red ink, green ink, and blue ink as the specific color ink may be included, or a nozzle array for fluorescent yellow ink as a fluorescent color ink may be included. Furthermore, silver ink, embossment ink, or clear ink having a function other than a function of reproducing color on a recording medium may be further included. In addition, metallic ink containing metallic particles may be included as the specific color ink in place of fluorescent pink ink.

A sheet feeding/discharge motor control unit 406 controls conveyance, feeding, and discharge of a recording medium, and controls the position of the recording medium in such a manner that ink discharged from the recording head 405 is landed on a correct position.

In consideration of a case where the recording head 405 has a multi-pass configuration, a start/stop operation of a motor is executed.

A recording unit interface (I/F) 407 exchanges a data signal with the image processing unit 402. The recording unit I/F 407 and the image processing unit 402 are connected via an I/F signal line 417. For example, the I/F signal line 417 complying with the specifications of Centronics Corporation can be applied. A data buffer 408 temporarily stores image data received from the image processing unit 402. An operation unit 409 includes a mechanism for a developer to perform a command operation. A system bus 410 connects the functional components of the recording unit 401.

On the other hand, in the image processing unit 402, an image processing unit main control unit 411 includes a CPU, a ROM, and a RAM and performs various types of processing on an image supplied from the RIP software 103 to generate image data recordable by the recording unit 401. Because the CPU constituting part of the control unit can operate a hardware circuit of an ASIC, the ASIC may be included as a component. A look-up table or a matrix to be used is preliminarily recorded in the ROM in the image processing unit main control unit 411 for each type of recording medium or each print mode. An image processing unit I/F 412 exchanges a data signal with the recording unit 401. An external connection I/F 416 exchanges image data with the RIP software 103 connected by the I/F signal line 417. A display unit 413 displays various types of information to the user. For example, a liquid crystal display (LCD) can be applied as the display unit 413. An operation unit 414 is a mechanism for the user to perform a command operation. For example, a keyboard and a mouse can be applied as the operation unit 414. A system bus 415 connects the image processing unit main control unit 411 with other functional components.

Figure 5A:
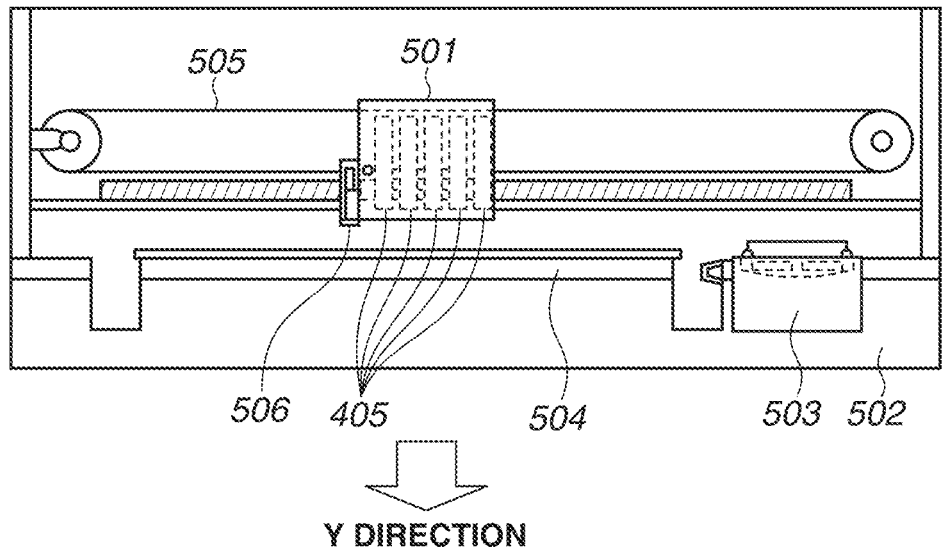
FIGS. 5A and 5B are sectional views for illustrating a configuration of a recording unit of an inkjet recording apparatus.

FIG. 5A is a sectional view for illustrating a configuration of an inkjet recording apparatus being the printer 104. A carriage 501 is equipped with the recording head 405 including a number of nozzle arrays corresponding to the number of ink colors, and an optical sensor 506, and reciprocates in an X direction in FIG. 5A by a drive force of a carriage motor that is transmitted via a belt 505. While the carriage 501 is moving in the X direction relative to a recording medium, an ink droplet is discharged in a Z direction from each nozzle provided in the recording head 405 based on recording data. By the discharge operation, ink is applied to the recording medium placed on a platen 504, and an image corresponding to one scanning is recorded. When one scanning and recording operation ends, a conveyance operation is performed in a Y direction (conveyance direction) intersecting the X direction in FIG. 5A by an amount corresponding to a recorded width of the image corresponding to one scanning. By alternately repeating the scanning and recording operation and the conveyance operation a plurality of times, an image is formed on the recording medium.

The optical sensor 506 performs a detection operation while moving together with the carriage 501 to detect the presence or absence of a recording medium on the platen 504. A recovery unit for performing maintenance processing of the recording head 405 is provided at a position within a scanning region of the carriage 501 but outside the platen 504.

Figure 5B:
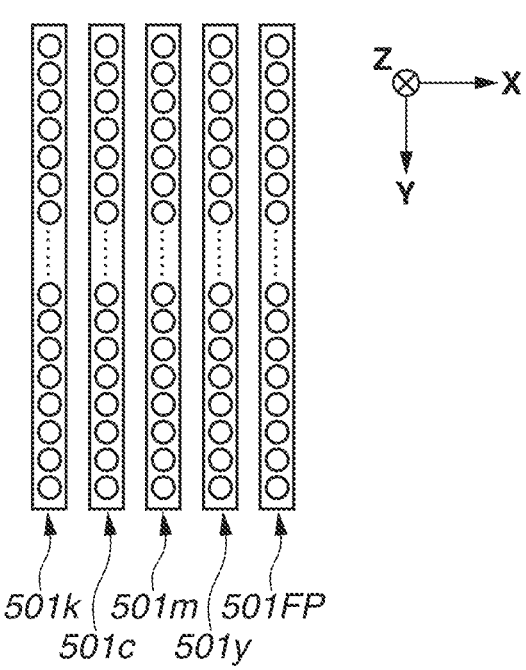

FIG. 5B is a diagram illustrating the arrangement of nozzle arrays in the carriage 501 viewed from the apparatus top surface (in a −z direction). In the carriage 501, five nozzle arrays are arranged at different positions in the X direction. As described above, the five nozzle arrays are a nozzle array 501C corresponding to cyan (C) ink, a nozzle array 501M corresponding to magenta (M) ink, a nozzle array 501Y corresponding to yellow (Y) ink, a nozzle array 501K corresponding to black (K) ink, and a nozzle array 501P corresponding to fluorescent pink (P) ink. C ink is discharged from nozzles of the nozzle array 501C. M ink is discharged from nozzles of the nozzle array 501M. Y ink is discharged from nozzles of the nozzle array 501Y. K ink is discharged from nozzles of the nozzle array 501K. P ink is discharged from nozzles of the nozzle array 501P. In each of the nozzle arrays, a plurality of nozzles for discharging ink as droplets is arrayed at predetermined pitches in the Y direction.

In FIGS. 5A and 5B, the carriage 501 equipped with the recording head 405 is assumed to move in the X direction, but the configuration is not limited to the above-described configuration as long as an image can be recorded on a recording medium by relative movement. For example, the recording head 405 may be what is called a full multi recording system recording head including nozzle arrays having a length exceeding the width of a recording medium in the X direction, and forming an image by applying ink to the recording medium conveyed in the Y direction.

Fluorescent ink used in the present exemplary embodiment will be described. In the present exemplary embodiment, fluorescent ink created by mixing dispersion having a fluorescent property, solvent, and activator is used. Fluorescent dispersion used in fluorescent ink according to the present exemplary embodiment is dispersion having a fluorescent property. For example, NKW-3207E (fluorescent pink aqueous dispersion: Japan Fluorescent Chemical) or NKW-3205E (fluorescent yellow aqueous dispersion: Japan Fluorescent Chemical) can be used, but any dispersion can be used as long as the dispersion has a fluorescent property.

By combining the above-described fluorescent dispersion with known solvent and activator and dispersing the fluorescent dispersion, ink is formed. A dispersing method of the fluorescent dispersion is not specifically limited. For example, fluorescent dispersion dispersed using surfactant, or resin dispersed fluorescent dispersion dispersed using dispersion resin can be used. As a matter of course, fluorescent dispersions dispersed using different dispersing methods can be used in combination. As the surfactant, anionic surfactant, nonionic surfactant, cationic surfactant, or ampholytic surfactant can be used. As the dispersion resin, any resin can be used as long as the resin has water solubility or water dispersibility. Among such resins, dispersion resin with weight-average molecular weight of 1,000 or more and 100,000 or less is particularly desirable. Furthermore, dispersion resin with weight-average molecular weight of 3,000 or more and 50,000 or less is particularly desirable. For example, aqueous medium containing water and water-soluble organic solvent is desirably used as the solvent.

A fluorescent color material is a color material that develops color by entering an excited state from a ground state by absorbing light in an exciting wavelength and returning to the ground state by emitting light in an emission wavelength.

Figure 10:
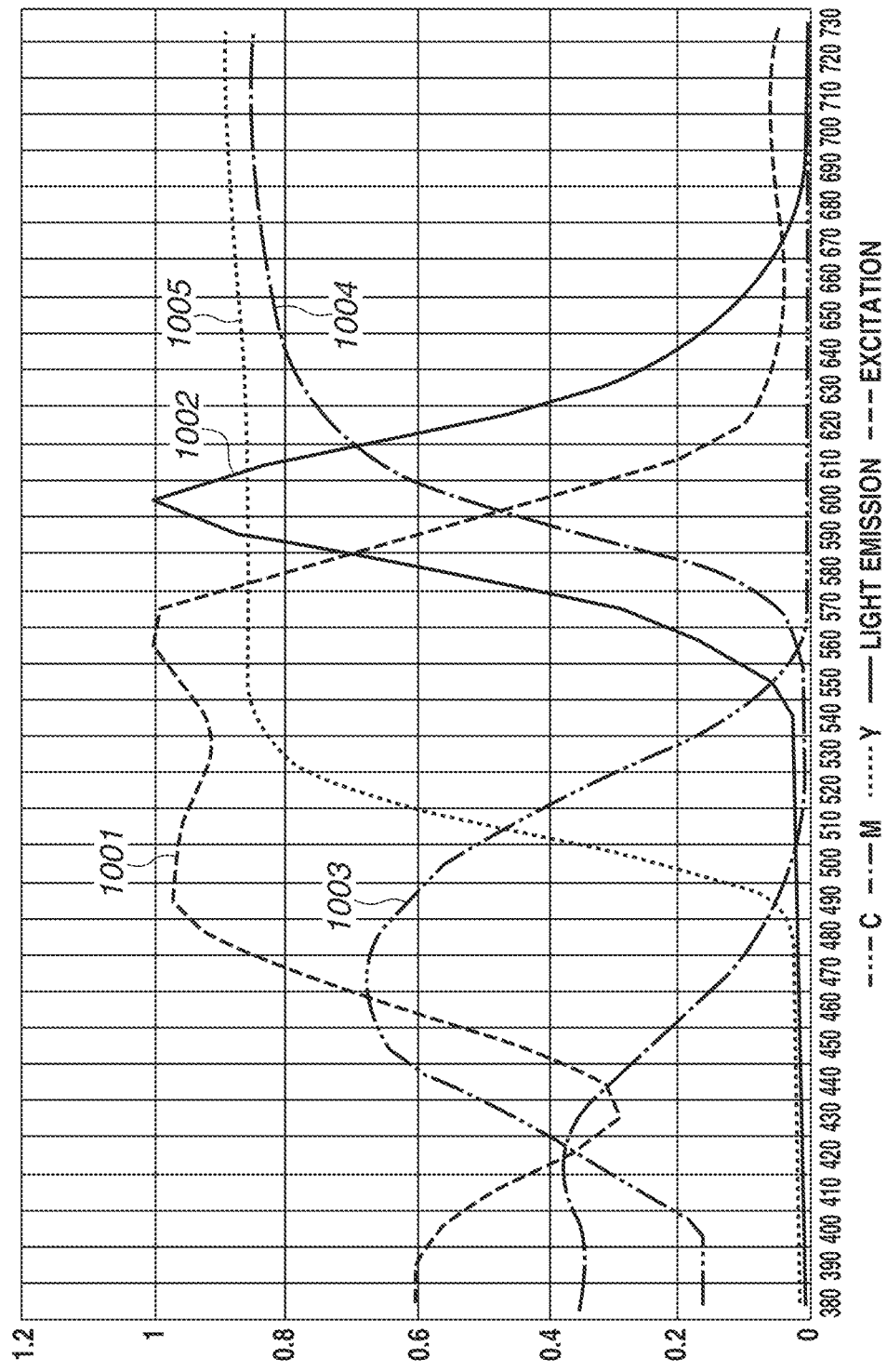
FIG. 10 illustrates an intensity graph with respect to wavelength used in recording on a recording medium.

FIG. 10 illustrates a graph indicating the intensity of excitation 1001 and the intensity of light emission 1002 in an image recorded on a recording medium using fluorescent pink ink. In the graph illustrated in FIG. 10, a horizontal axis indicates a wavelength of light, and a vertical axis indicates intensity. The graph indicates the intensity of light detected when a wavelength of light applied to a record sample is changed, and the intensity of light detected when a wavelength of light to be received from a record sample is changed. FIG. 10 illustrates, for each wavelength, the intensity of light received from the record sample when light in the exciting wavelength is applied to the record sample.

The light emission 1002 is a line indicating the intensity of light detected when light in a wavelength of 480 nm is applied to a print sample of fluorescent pink in the present exemplary embodiment. The excitation 1001 indicates the intensity of light received when a wavelength of light to be applied to the record sample is changed while a wavelength of light to be received is fixed. FIG. 10 illustrates a graph indicating the intensity of light detected when a wavelength of light to be received is fixed to 600 nm for fluorescent pink in the present exemplary embodiment. As seen from FIG. 10, a wavelength band in which fluorescent ink recorded on a recording medium is excited overlaps a wavelength band of light emission, and exists on a short wavelength side. The excitation 1001 has differences in intensity depending on the wavelength, and includes wavelengths in which light is efficiently emitted and wavelengths in which light is not efficiently emitted. Since a fluorescent color material emits light, a reflectance in the light emission wavelength often exceeds 1. In the present exemplary embodiment, a color material having the above-described characteristics is defined as the fluorescent color material.

The excitation and light emission of fluorescent pink have been described above, but fluorescent ink that emits light in another wavelength may be used in embodiments of the present disclosure. For example, fluorescent blue that emits light in a blue region (450 nm to 500 nm), or fluorescent green that emits light in a green region (500 nm to 565 nm) may be used. Fluorescent yellow that emits light in a yellow region (565 nm to 590 nm) may be used. Fluorescent orange or fluorescent red that emits light in a red region (590 nm to 780 nm) may be used.

Furthermore, fluorescent ink obtained by combining the above-described inks may be used. For example, fluorescent yellow obtained by combining light emission in the yellow region and the red region may be used. Furthermore, a color tone may be adjusted by combining fluorescent inks having different intensities in an exciting wavelength. For example, fluorescent pink having weak excitation in the blue region, strong excitation in the green region, and emitting light in an orange region may be used.

In the present exemplary embodiment, subtractive color ink is defined as ink that absorbs light in a predetermined specific wavelength among emitted light rays and contains a color material that does not emit light. In the present exemplary embodiment, inks of four colors corresponding to cyan, magenta, yellow, and black inks are subtractive color ink. In FIG. 10, a spectral reflectance 1003 indicates a spectral reflectance of cyan (C) ink, a spectral reflectance 1004 indicates a spectral reflectance of magenta (M) ink, and a spectral reflectance 1005 indicates a spectral reflectance of yellow (Y) ink. The graph in FIG. 10 indicates measurement results obtained by a known measurement method of the spectral reflectance. Because subtractive color ink merely absorbs light unlike fluorescent ink, reflectance does not exceed 1.

Next, a case where fluorescent ink and subtractive color ink are mixed on a recording medium will be described.

In a case where fluorescent pink and yellow are mixed, yellow absorbs light in the wavelength band of the excitation 1001 of fluorescent pink. Thus, fluorescent pink cannot be sufficiently excited since exciting light is absorbed by yellow, and light emission is suppressed. In a case where fluorescent pink and cyan are mixed, cyan absorbs light in the wavelength band of the light emission 1002 of fluorescent pink. Thus, light emitted by fluorescent pink is absorbed by cyan ink, and light emission is suppressed. In a case where fluorescent pink and magenta are mixed, magenta absorbs light in the wavelength band with high excitation sensitivity of fluorescent pink and also absorbs emitted light. In other words, in a case where fluorescent pink ink and subtractive color ink are mixed on a recording medium, a rate of contribution to color development that is given by fluorescent pink ink drastically declines.

Figure 11:
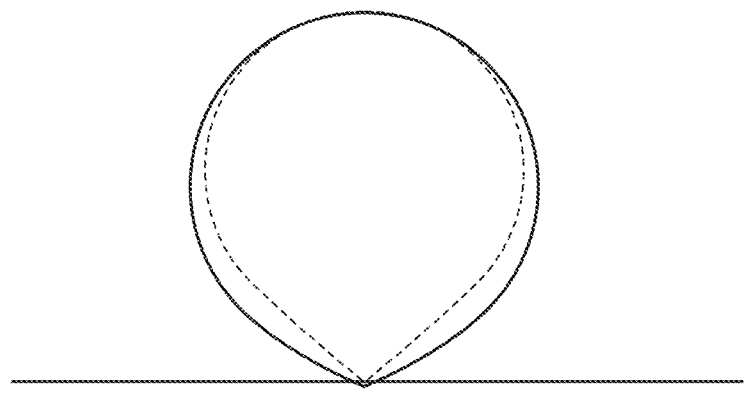
FIG. 11 illustrates deviation angle reflection characteristics of subtractive color ink and fluorescent ink.

FIG. 11 is a diagram illustrating deviation angle reflection characteristics of fluorescent ink and subtractive color ink. A solid line indicates the deviation angle reflection characteristics of fluorescent ink, and a broken line indicates deviation angle reflection characteristics of subtractive color ink. FIG. 11 schematically illustrates a bidirectional reflectance distribution function. A known method may be used as a measurement method of the deviation angle reflection characteristics. For example, a method of emitting vertical light to a sample recorded on a recording medium and detecting received reflected light at varied angles is known. As seen from FIG. 11, compared with the deviation angle reflection characteristics of subtractive color ink, the deviation angle reflection characteristics of fluorescent ink indicate isotropically-scattered light. This is because the directionality of incident light is lost by fluorescent ink absorbing light, being excited, and emitting light, and the directionality of incident light strongly depends on the directionality of light emitted by fluorescent ink. Thus, through the experiment, it can be seen that fluorescent ink has stronger light scattering as compared with subtractive color ink.

As characteristics of fluorescent ink, a color change caused by a change in an environmental light spectrum in a visible light region is smaller as compared with subtractive color ink. Normally, the color of subtractive color ink appears differently depending on a light source. This is because subtractive color ink has a property of representing color by absorbing light in a specific wavelength and reflecting remaining components. On the other hand, fluorescent ink has characteristics of "excitation" and "light emission" that are different from absorption and reflection. Because a light emission wavelength remains in the same wavelength band irrespective of environmental light, fluorescent ink is unsusceptible to an environmental light spectrum particularly in the visible light region.

Figure 15:
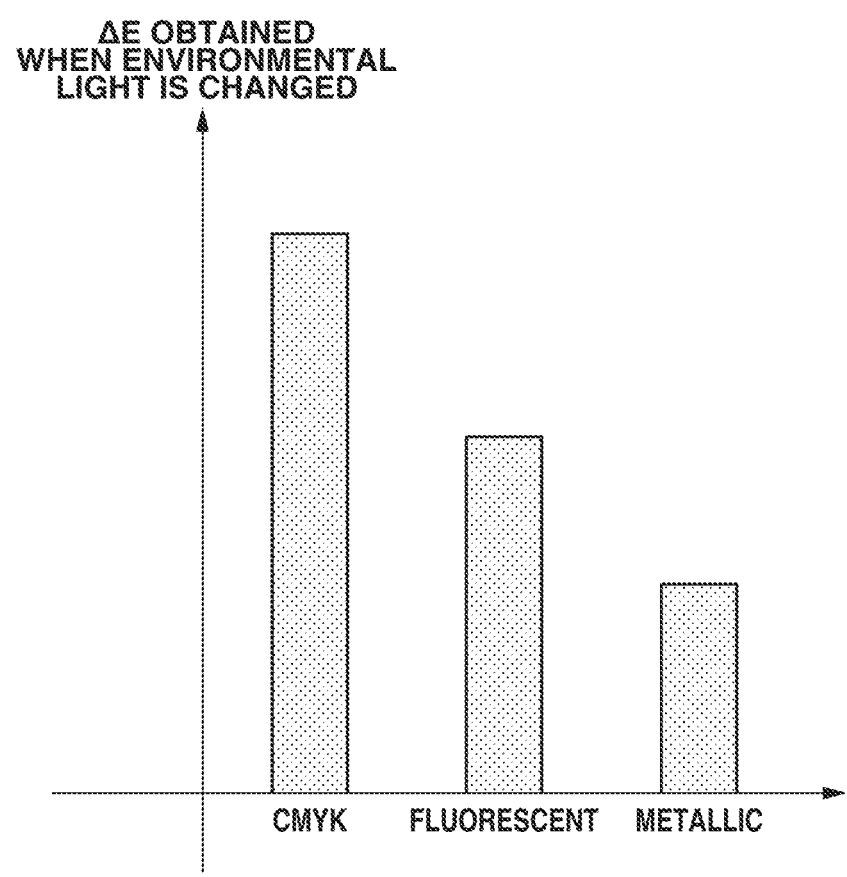
FIG. 15 illustrates a graph indicating a difference ΔE generated in a case where environmental light is changed.

FIG. 15 illustrates a graph indicating a difference ΔE in each ink color that is generated in a case where environmental light is changed. The difference ΔE is a numerical value representing a difference in CIE-Lab that is generated in the case where environmental light is changed. A color change generated in the case where environmental light is changed is larger in subtractive color ink than in fluorescent ink.

In this manner, characteristics related to tint are different between subtractive color ink and fluorescent ink. In the case of recording an image using both of the inks, colors recorded using subtractive color ink vary depending on a light source in a similar way for all colors. On the other hand, colors recorded using fluorescent ink are less variable depending on the light source. In the processing of restricting an ink application amount, which will be described below, any of the inks to be used in recording is to be reduced. If an application amount of subtractive color ink is reduced, color balance may be disrupted in the case of light source change, and the user may recognize that image quality has deteriorated.

FIGS. 6A, 6B, 6C, and 6D are block diagrams illustrating processing to be executed in the design software 102, the RIP software 103, and the printer 104. FIGS. 6A, 6B, 6C, and 6D illustrate examples in which processing blocks are different.

First, description will be given with reference to FIG. 6A. In the design software 102, RGB data 601 and fluorescent pink data 602 are created as image data and input to the RIP software 103. The user who edits the design software 102 designates the density of fluorescent pink ink on a recording medium and inputs the density therein. As a designation method, the density may be designated by selecting a patch from the swatch screen 209 as described with reference to FIG. 2, or by setting a desired pixel value.

In plate-making 603 in the RIP software 103, the plate-making processing described with reference to FIG. 3 is executed on the RGB data 601 and the fluorescent pink data 602.

In a color management system (CMS) 604 in the RIP software 103, color management of the RGB data 601 is executed. In the color management, standard RGB data created in the design software 102 is converted into device RGB data compatible with a recording apparatus and the type of recording medium on which an image is to be recorded. A gap between appearance on a display of the PC 101 and appearance of a recorded product is thereby reduced. Because the size of a color gamut representable on the display is large relative to a recorded product, various mapping methods can be considered as the color management. For example, such methods include a method of attaching a range exceeding a representable gamut of a recorded product to a gamut limitation of the recorded product, and a method of plotting all values in such a manner as to be pushed toward the gamut center. In the present exemplary embodiment, the RGB data 601 is assumed to be input to the CMS 604. The fluorescent pink data 602 is generally not input to the CMS 604, but whether to execute CMS on the fluorescent pink data 602 is not limited.

Each processing block in the printer 104 is executed by the image processing unit main control unit 411 illustrated in FIG. 4.

In ink separation 605, ink separation processing is executed on the RGB data 601 on which color management has been executed. In the ink separation processing, based on a color distribution of RGB, colors are separated into ink data including corresponding components for each ink color included in the recording head 405. In the present exemplary embodiment, data is generated in 256 gradations corresponding to four colors of ink, namely cyan, magenta, yellow, and black, out of five colors of ink included in the recording head 405 excluding fluorescent pink. A parameter of the ink separation processing is designed so as to be smaller than or equal to an application amount upper limit per unit region of a recording medium on which an image is to be recorded. More specifically, before the ink separation processing is performed, type information indicating the type of recording medium, and information regarding quality and modes in the recording unit 401 are acquired, and a parameter of the ink separation processing is selected based on such pieces of information.

The application amount upper limit in the ink separation processing is determined based on several design guides. For example, the application amount upper limit value is defined to prevent generation of unevenness on a recording medium by further applying ink. Further, the design guides are design guides considering that ink discharged onto a recorded result does not adhere to a recording medium of a next recorded result in continuous recording, and considering that ink on a recording medium does not overflow to adhere to the surface of the recording head 405. In FIG. 6A, since the fluorescent pink data 602 input from the design software 102 to the RIP software 103 is density data indicating ink density in 256 gradations, the fluorescent pink data 602 is not subjected to the processing of the ink separation 605. The number of gradations is not limited to 256.

In γ conversion 606, a signal value of each ink data included in the printer is subjected to gradation conversion using a γ curve. This is executed for the purpose of linearly associating a change in a signal value output by the ink separation 605 with density on a recording medium. If a drop of ink is discharged onto a white background of a recording medium, color suddenly changes from white. On the other hand, even if a drop of ink is further added to a state in which a few drops of ink has already been discharged, a color change is subtle. The γ conversion 606 applies the γ curve to the signal value in such a manner that apparent color linearly changes. In the present exemplary embodiment, the fluorescent pink data 602 input from the design software 102 to the RIP software 103 is also subjected to the γ conversion 606.

A method of performing conversion using a look-up table is generally used in the ink separation 605 and the γ conversion 606, but the method is not limited to this. For example, a method of performing conversion using a formula may be used.

In application amount restriction 607, the correction of an application amount is executed on data of all ink colors including the fluorescent pink data 602. The correction is executed for the purpose of restricting ink amounts in such a manner that the total amount of inks applied per unit area does not exceed an upper limit receivable by a recording medium. In the present exemplary embodiment, it is determined whether the total value of application amounts to one pixel in image data of each ink color that has been generated in the ink separation 605 exceeds an upper limit value being a threshold value. In a case where the total value exceeds the upper limit value, an ink amount is reduced in such a manner that the total value does not exceed the upper limit value.

The upper limit receivable by a recording medium, which is to be used in the determination of the application amount restriction 607, may be the same as or different from the application amount upper limit described in the ink separation 605. In the present exemplary embodiment, the upper limit is the same value as the application amount upper limit set as a parameter to be used in the ink separation 605. In the ink separation 605, a boundary value at which unevenness is generated in an image if ink is further applied is set as the upper limit. On the other hand, in the application amount restriction 607, a boundary value above which ink discharged onto a recorded result can adhere to a recording medium of a next recorded result in continuous recording may be set as an upper limit. The details of the application amount restriction 607 will be separately described below.

In quantization 608, each piece of ink data having been subjected to γ conversion 606 is converted into dot data. By discharging ink, a printer represents density on a recording medium. Nevertheless, due to various factors such as nozzle arrangement density of a print head, power used, ink filling, and recording productivity demanded by the user, the number of dots that can be discharged into an area of 600 dots per inch (dpi)×600 dpi is limited. To represent the density represented in ink data on a recording medium, in the quantization 608, dots are dispersedly arranged in each area of 600 dpi×600 dpi. By representing the density at 1200 dpi or 2400 dpi, or in a wider size, area coverage modulation is implemented. The dot resolution described here is merely an example, and the dot resolution in the present disclosure is not limited to this.

Figure 6A:
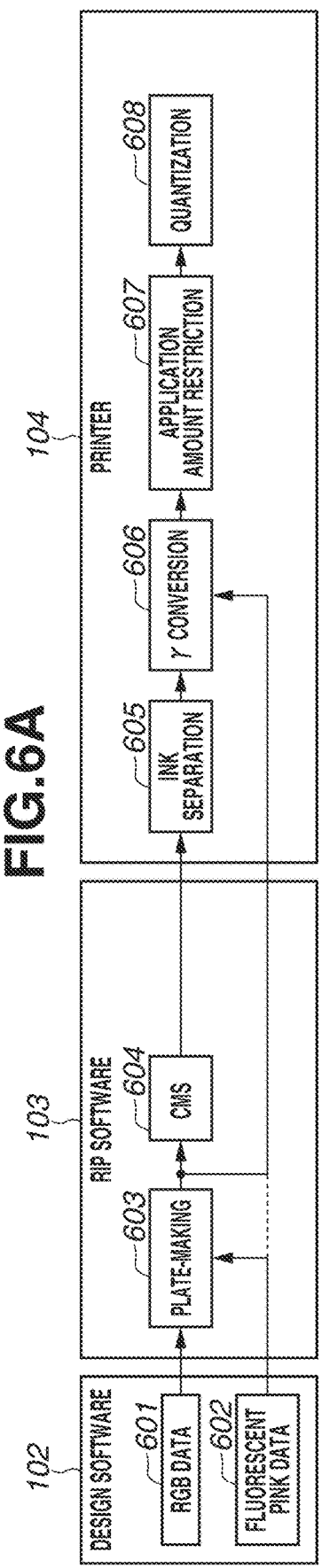
Figure 6B:
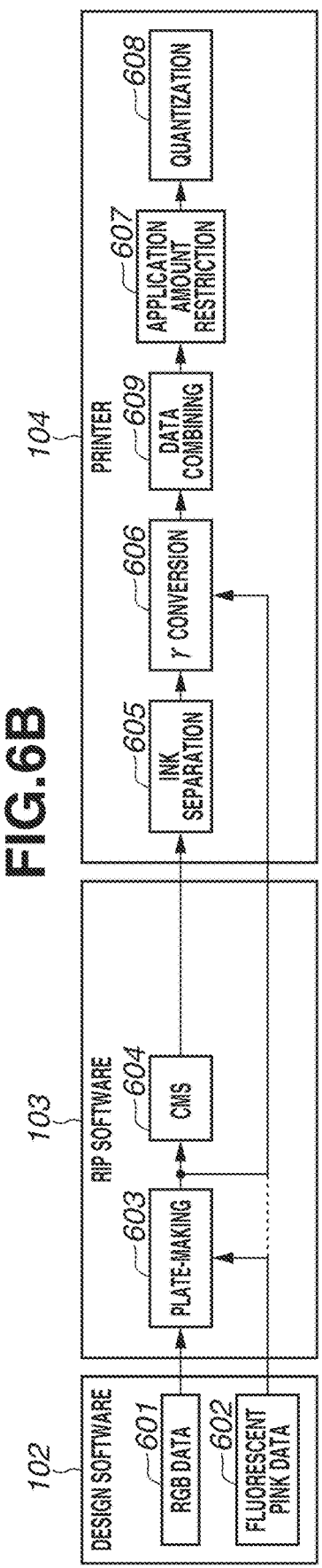

FIG. 6B illustrates a processing block different from those in FIG. 6A. A difference from FIG. 6A will now be described. In ink separation 605 in FIG. 6B, it is assumed that the input RGB data 601 is converted into fluorescent pink data.

In data combining 609, pieces of data of the same color, which are the fluorescent pink data converted in the ink separation 605 and the fluorescent pink data 602 input from the RIP software 103, are combined, and a combined result is output. The data combining 609 may be executed before the γ conversion 606. Alternatively, the data combining 609 may be executed after the application amount restriction 607 or the quantization 608. In the processing block, two pieces of ink data of fluorescent pink are combined into a single piece of data corresponding to a head of a printer. As a method of combining, the knockout, the overprint, or the multiplication described with reference to FIG. 3 may be used, or another method may be used.

FIG. 6C illustrates a processing block different from those in FIGS. 6A and 6B. A difference from FIGS. 6A and 6B will now be described. In FIG. 6C, CMYK data 610 is input from the design software 102. In RGB conversion 611, the input CMYK data 610 is converted into RGB data. The RGB conversion 611 may be integrated with the CMS 604. The data combining 609 is executed in FIG. 6C, but the data combining 609 needs not be executed if fluorescent pink data is not generated in the ink separation 605 as in FIG. 6A.

FIG. 6D illustrates a processing block different from those in FIGS. 6A, 6B, and 6C.

A difference from FIGS. 6A, 6B, and 6C will now be described. In FIG. 6D, ink data 612 is input from the design software 102. The ink data 612 is data corresponding to cyan, magenta, yellow, or black ink, for example. Similarly to the fluorescent pink data 602, the user designates density of another color ink and inputs the density.

In density separation 613, the ink data 612 excluding fluorescent pink data is separated into a plurality of pieces of ink data. For example, cyan data is separated into cyan data and light cyan data, and magenta data is separated into magenta data and light magenta data. Because light-color ink such as light cyan ink and light magenta ink is used in such a manner that graininess becomes invisible in a recorded product, ink data is not generated by the user but by a printer. The density separation 613 is enabled in a case where light-color ink is included among inks included in the recording head 405. In a case where light-color ink is not used, or ink data of light-color ink is to be created by the user using the design software 102, the density separation 613 needs not be executed.

In all use cases illustrated in FIGS. 6A to 6D, the application amount restriction 607 is executed. In FIGS. 6A to 6C, only the fluorescent pink data 602 is not subjected to the ink separation 605. Thus, if the fluorescent pink data 602 is included in an output result of the ink separation 605, the total value of ink application amounts is expected to increase. In a case where the total value of ink application amounts per unit area is larger than a threshold value, ink overflowing can occur in a recorded product, and image quality deterioration can occur. In FIG. 6D, since the user can freely set the densities of all pieces of ink data, the possibility of occurrence of the ink overflowing is higher. The application amount restriction 607, which is a characteristic configuration of embodiments of the present disclosure, is the processing block for solving such an issue.

FIG. 7 is a flowchart for illustrating a program of application amount exceedance determination processing executed in the application amount restriction 607. A series of processes in FIG. 7 are executed by the CPU of the image processing unit main control unit 411.

In step S701, a variable SUM and a variable i are initialized to 0. The variable SUM and the variable i are to be used afterward in the flowchart.

In step S702, loop processing is executed. The variable i functions as a loop counter and is initialized to 0 in step S701. COL_NUM is associated with the number of ink colors included in the recording head 405. For example, in a case where ink discharged from the recording head 405 includes inks of five colors, namely cyan, magenta, yellow, black, and fluorescent pink, COL_NUM is 5. The loop counter i executes loop processing the number of times corresponding to (COL_NUM−1). In a case where the loop counter i is smaller than or equal to COL_NUM−1 (YES in step S702), the processing proceeds to step S703.

In step S703, an application amount of an ink having an ink ID corresponding to the loop counter i is added to the variable SUM.

In step S704, the loop counter i is incremented. The loop processing in steps S703 and S704 is executed the number of times corresponding to (COL_NUM−1).

In step S705, determination processing is executed using the variable SUM and an application amount exceedance determination threshold value TH. The threshold value TH is associated with an upper limit receivable by a recording medium. For example, if the apparatus may be broken down due to ink overflowing from a recording medium in a case where an ink application amount exceeds 1000 on a glossy recording medium, the threshold value TH=1000 is set. As the threshold value TH, a different value can be set based on the type of recording medium. In addition, the number of times of scanning by the recording head 405 in a designated region of a recording medium varies depending on recording quality selectable by the user. Because the upper limit receivable by a recording medium varies due to a change in landing timing that is caused by a difference in the number of times of scanning, a different value can be set depending on the recording quality in addition to the type of recording medium. The threshold value TH is stored in the ROM or the RAM included in the image processing unit main control unit 411, and is acquired based on at least one of type information of a recording medium and quality information indicating recording quality. When a procedure illustrated in FIG. 7 is executed, a threshold value may be externally set via the operation unit 414, or a threshold value may be acquired from RIP software or an external hard disk drive (HDD) via the external connection I/F 416. In a case where the variable SUM is larger than or equal to the threshold value TH (YES in step S705), the processing proceeds to step S706. In a case where the variable SUM is smaller than the threshold value TH (NO in step S705), the processing proceeds to step S707.

In step S706, since the total value of ink application amounts exceeds the upper limit receivable by a recording medium, the processing proceeds to an application amount restriction processing flowchart.

In step S707, since the total value of ink application amounts is smaller than the upper limit receivable per pixel of a recording medium, the application amount restriction 607 is ended without proceeding to the application amount restriction processing flowchart.

A series of processing procedures illustrated in FIG. 7 are executed on all pixels for each pixel. In other words, in the present exemplary embodiment, based on CMYK values and a fluorescent P value of each pixel, the total value of ink application amounts per pixel is compared with a threshold value.

FIG. 8 illustrates an ink ID, an ink name, and an application amount to be applied to a certain pixel. In the example illustrated in FIG. 8, ink IDs 0 to 4 are set, cyan ink is associated with the ink ID 0, and an application amount of cyan ink to be applied to the certain pixel is set to 250. The ink ID in step S703 of FIG. 7 corresponds to any of the ink IDs 0 to 4 in FIG. 8. The application amount is expected to vary depending on the pixel. In the example illustrated in FIG. 8, the total value SUM of application amounts is 1015. Because SUM≥TH is satisfied in a case where the threshold value TH=1000, the processing proceeds to the application amount restriction processing.

Figure 9:
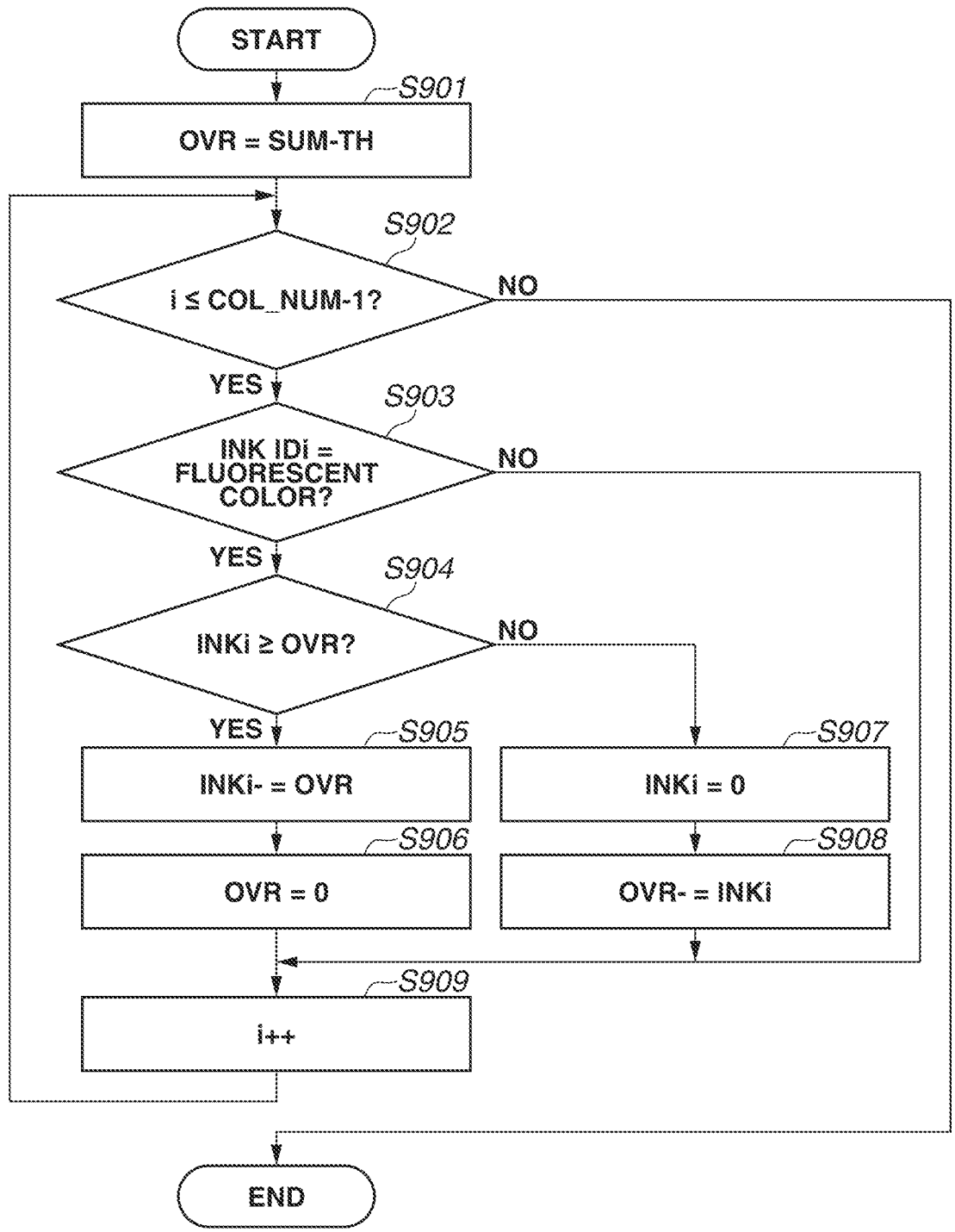
FIG. 9 is an application amount restriction processing flowchart according to the first exemplary embodiment.

FIG. 9 is a flowchart for illustrating a program of the application amount restriction processing executed in the application amount restriction 607. A series of processes in FIG. 9 are executed by the CPU of the image processing unit main control unit 411.

In step S901, a variable OVR is used. The variable OVR is calculated using the variable SUM and the threshold value TH used in FIG. 7. In step S901, the value of the variable SUM reflects a result of sequentially adding the ink application amounts in step S703 in the flowchart of FIG. 7. The variable OVR indicates an excess amount of the total value of ink application amounts to a target pixel with respect to the upper limit receivable by a recording medium.

In step S902, loop processing is executed. The variable i functions as a loop counter and is initialized to 0 in step S701. COL_NUM is associated with the number of ink colors included in the recording head 405. For example, in a case where the recording head 405 handles cyan, magenta, yellow, black, and fluorescent pink inks, COL_NUM is 5.

The loop counter i executes loop processing the number of times corresponding to (COL_NUM−1). In a case where the loop counter i is smaller than or equal to COL_NUM−1 (YES in step S902), the processing proceeds to step S903.

In step S903, it is determined whether an ink ID corresponding to the loop counter i is associated with fluorescent color. As illustrated in FIG. 8, in the present exemplary embodiment, ink ID 4 is associated with fluorescent color. In a case where the ink ID corresponding to the loop counter i indicates an ink of fluorescent color, the processing proceeds to step S904. In a case where the ink ID corresponding to the loop counter i indicates an ink of color other than fluorescent color, the processing proceeds to step S909.

In step S904, an application amount of ink having an ink ID corresponding to the loop counter i that is to be applied to the target pixel is compared with the variable OVR. If the variable OVR is smaller than or equal to the application amount (YES in step S904), the processing proceeds to step S905. If not (NO in step S904), the processing proceeds to step S907.

In step S905, an ink application amount is corrected by subtracting the variable OVR from the application amount of the ink having an ink ID corresponding to the loop counter i that is to be applied to the target pixel. In step S906, the value of the variable OVR is updated to 0. In steps S905 and S906, an ink application amount of fluorescent color is reduced using the variable OVR indicating an excess amount from the threshold value.

In step S907, an application amount of the ink having an ink ID corresponding to the loop counter i is corrected to 0.

In step S908, the value of the variable OVR is updated by subtracting the application amount of the ink having an ink ID corresponding to the loop counter i, from the value of the variable OVR.

In steps S907 and S908, an ink application amount of fluorescent color is set to 0 using the variable OVR indicating an excess amount. In a case where the number of colors defined by COL_NUM includes a plurality of fluorescent colors, ink application amounts of the fluorescent colors are corrected to 0 one by one until the total value of the ink application amounts falls within the threshold value TH being the upper limit. According to the flowchart, reduction processing is sequentially performed on a plurality of fluorescent inks from an ink having the smallest ink ID number.

In step S909, the loop counter i is incremented. The loop processing in steps S903 and S904 is executed the number of times corresponding to (COL_NUM−1).

By executing the above-described procedure, the total value of ink application amounts is adjusted to be smaller than or equal to the ink application amount upper limit by changing the application amount of fluorescent ink with respect to an excess amount from the ink application amount upper limit. As illustrated in FIGS. 6A to 6D, even in the case where the user directly designates a value of an application amount of fluorescent pink, deterioration of image quality caused by ink overflowing on a recording medium can be prevented by referring to the total value of ink application amounts and an upper limit receivable by the recording medium.

In the example of the present exemplary embodiment, only the application amount of fluorescent pink ink is corrected in such a manner that the total value does not exceed the upper limit. Among the inks of five colors that are included in the recording head 405, the application amount of fluorescent ink is reduced by the largest amount. An example of also reducing an application amount of subtractive color ink will be described in a third exemplary embodiment to be described below.

In the above-described first exemplary embodiment, as illustrated in the flowchart in FIG. 7, calculation of adding the application amounts of inks, to the variable SUM, of the number of colors defined by COL_NUM is executed. In this method, there is a concern that a processing load increases as the number of ink colors increases.

In a second exemplary embodiment, a method of saving the processing load involved in the calculation of the variable SUM will be described. Specifically, when RGB data or CMYK data is converted, in the ink separation 605, into data compatible with the number of ink colors included in the recording head 405, a total value of ink application amounts of all ink colors after conversion is generated.

FIG. 12 illustrates an example of a look-up table to be used in the conversion in the ink separation 605. The description will be provided using the example illustrated in FIG. 6A, and RGB data including three colors is input to the ink separation 605. In a case where the ink separation 605 is executed, the ink application amounts of cyan, magenta, yellow, and black are output. At this time, the variable SUM indicating the total application amount of output results is also output. For example, in a case where output values are (cyan, magenta, yellow, black)=(220, 220, 250, 100), a value of the variable SUM=790 is output. When the ink application amounts are output by the ink separation 605, an application amount of fluorescent pink is not added to the variable SUM.

Figure 13:
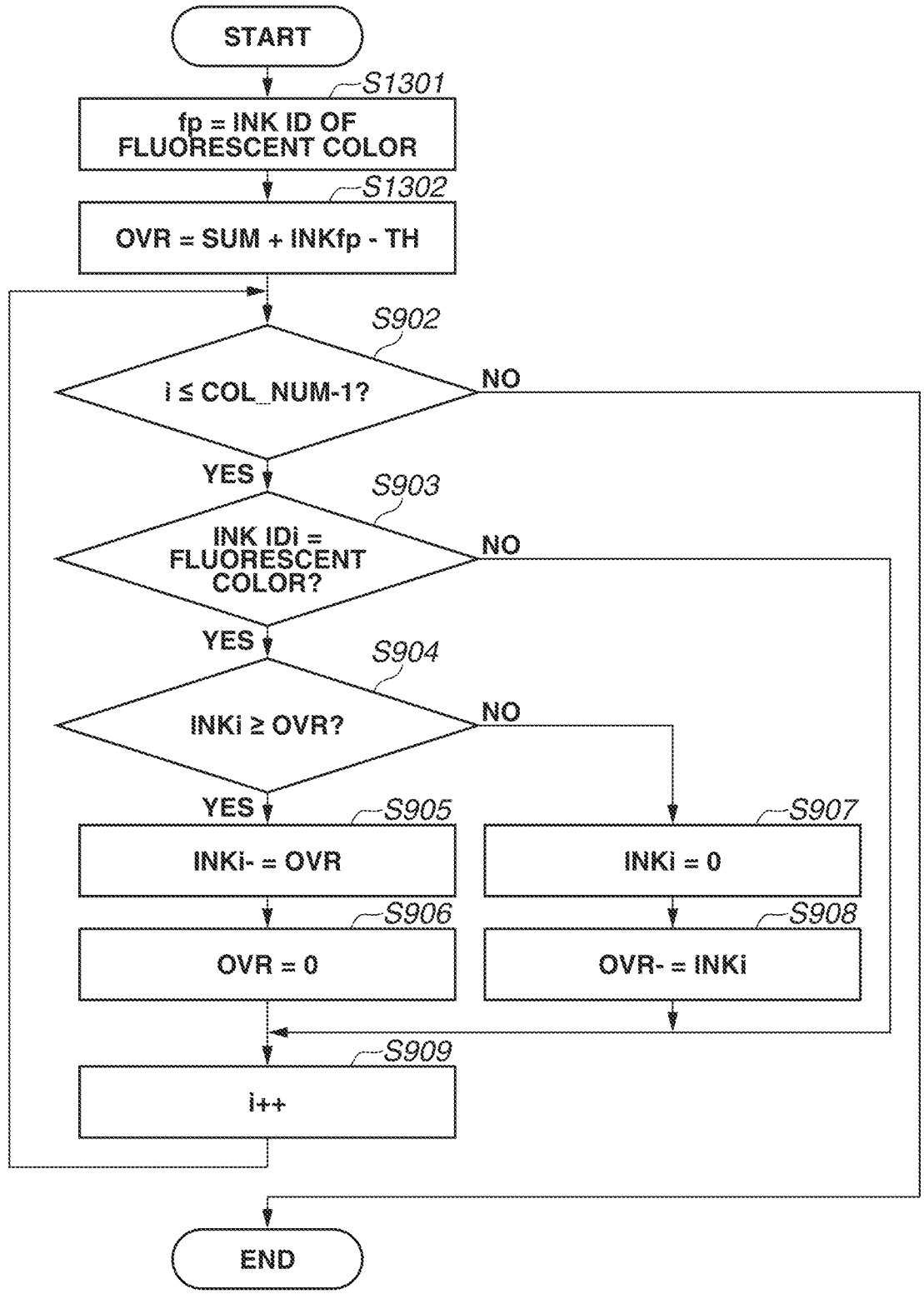
FIG. 13 is an application amount restriction processing flowchart according to a second exemplary embodiment.

FIG. 13 is a flowchart of application amount restriction processing executed in the application amount restriction 607 according to the present exemplary embodiment. In the present exemplary embodiment, exceedance determination and restriction processing are represented in one flowchart. A series of processes in FIG. 13 are executed by the CPU of the image processing unit main control unit 411. A difference from FIG. 9 will now be described.

In step S1301, an ink ID of fluorescent color is acquired and stored in a variable fp.

In step S1302, using the variable OVR, an excess amount of an ink application amount with respect to an upper limit value receivable by one pixel on a recording medium is calculated. As a formula, the total value of application amounts of all inks is calculated by adding an application amount of fluorescent color ink corresponding to the ink ID fp to the variable SUM converted using the look-up table illustrated in FIG. 12. Then, the excess amount is calculated by subtracting the threshold value TH from the calculated total value of application amounts of all inks.

In a case where there are two or more ink colors that have not been added in the calculation of the variable SUM in the ink separation 605 among ink colors included in the recording head 405, the number of ink colors whose ink application amounts are added in step S1302 is increased to two or more.

By executing the above-described procedure, the number of times addition is executed to calculate the variable SUM can be reduced as compared with the first exemplary embodiment, and thus a load put on calculation processing can be reduced.

Since a look-up table is used, a value between grid points in the look-up table includes a margin of error. In addition, as the value of the variable SUM to be converted in the ink separation 605, a total value of values obtained by performing the γ conversion 606 on the application amounts of the inks can also be set. In this case, a conversion error caused by the look-up table becomes larger.

The conversion error becomes larger because the look-up table cannot sufficiently reproduce a curve shape of a γ curve. The γ curve has a shape different for each ink color. In a case where a conversion error is desired to be reduced, it is sufficient that a conversion result of the variable SUM is modulated based on a signal value of ink of at least one color that has the largest change amount of an output Y with respect to a change amount of an input X for a γ curve of each ink color.

As an example, it is assumed that a γ curve of black changes the most steeply among γ curves of cyan, magenta, yellow, and black. An error can be reduced by executing the γ conversion 606 of the variable SUM using a γ curve that is based on a change amount of the γ curve of black.

As illustrated in FIGS. 6B and 6C, when fluorescent pink data is converted in the ink separation 605, the variable SUM is converted using a look-up table as illustrated in FIG. 14. Fluorescent pink data converted in the ink separation 605 is not added to the conversion result of the variable SUM.

In the first and second exemplary embodiments, in a case where the total value of ink application amounts to be applied to a target pixel exceeds the upper limit receivable by one pixel of a recording medium, the application amounts of subtractive color inks being basic colors are not changed, and the application amount of fluorescent ink is corrected. This is because fluorescent ink has a small color change caused by a change in environmental light in a visible light region as described above.

On the other hand, in a case where an excess amount from an upper limit value is large, an application amount of fluorescent ink may become 0. In a case where a recorded image is desired to include fluorescence, it is effective to reduce an application amount of subtractive color ink while mainly reducing the ink application amount of fluorescent ink to an extent that fluorescence of fluorescent ink is kept.

A ratio of reduction in fluorescent ink application amount and a ratio of reduction in subtractive color ink application amount can be controlled as follows, for example.

<Method 1. Reduction at Designated Ratio>

The value of the variable (excess amount) OVR is divided at the ratio of 7:3, and the value of 70% of the excess amount is used for reducing fluorescent ink, and the value of 30% thereof is used for reducing subtractive color ink. In reduction processing, the ratio is only to be set in such a manner that an amount by which fluorescent ink is reduced is larger than an amount by which subtractive color ink is reduced. Subtractive color ink may be reduced by an equal amount for all colors, or an ink with low brightness that is unlikely to generate an apparent color change may be reduced by a larger amount. For example, the apparent color change can be minimized by setting the reduction ratio so as to be larger as the brightness of ink dots is higher on a paper plane.

When subtractive color ink is reduced, a reduction ratio to be allocated to each ink color may be varied for each pixel. By varying the reduction ratio for each pixel, fluorescent ink can be continuously held.

A reduction ratio may be preset for each hue. A method of storing reduction ratios corresponding to CMYK pixel values before reduction in the ROM of the image processing unit main control unit 411 and reading the reduction ratios when executing the reduction processing may be used.

<Method 2. Reduction Based on Threshold Value>

With respect to the excess amount OVR, the largest value by which fluorescent ink can be reduced is set as a threshold value THf. In other words, an amount by which fluorescent ink is reduced becomes the threshold value THf, and an amount by which subtractive color ink is reduced is obtained by OVR−THf. A setting value of the threshold value THf can be set in such a manner that a reduction amount of fluorescent ink is larger than a reduction amount of each subtractive color ink. In addition, the threshold value THf may be varied depending on the density of fluorescent ink for each pixel. By varying the threshold value THf for each pixel, fluorescent ink can be continuously held.

In this manner, in the third exemplary embodiment, in the case where the total value of ink application amounts exceeds the upper limit, although the application amount of fluorescent ink is reduced by the largest amount, the application amount of fluorescent ink is set to a value larger than 0. At the same time, the application amount of subtractive color ink is reduced without significantly affecting tint of a recorded mage. With such a configuration, it is possible to prevent the overflowing of ink while maintaining contribution of fluorescent ink to a recorded mage.

In the above-described exemplary embodiments, in the flowcharts illustrated in FIGS. 9 and 13, the excess amount of the ink application amount with respect to the upper limit receivable by a recording medium is calculated. A method of calculating the excess amount is not limited to the above-described configuration. For example, the excess amount OVR can be calculated by including fluorescent pink data in data input to a look-up table in a case where the look-up table is used in the ink separation 605.

If an amount of information input to the look-up table can be increased, "fluorescent pink data obtained by reducing the excess amount" can also be converted using the look-up table.

While, in the above-described exemplary embodiments, fluorescent ink is used as the ink of specific color, determination processing and correction processing on fluorescent ink can also be applied to an ink other than fluorescent ink.

For example, as illustrated in FIG. 15, unlike subtractive color ink, metallic ink containing metallic particles does not contain an absorbing component. Thus, metallic ink has a property of being unsusceptible to environmental light as compared with subtractive color ink. As compared with subtractive color ink and fluorescent ink containing a color component, a difference ΔE indicating a color change caused in a case where an application amount is reduced is small. Thus, when an application amount is reduced, it is desirable to prioritize metallic ink over subtractive color ink. With such a configuration, it is possible to prevent image quality deterioration caused by ink overflowing while suppressing variation in tint in a recorded mage. Metallic particles are typified by particles of silver, but are not limited thereto. The metallic particles may be particles of gold, silver, copper, platinum, aluminum, titanium, chromium, iron, nickel, zinc, zirconium, or tin. The metallic particles may be particles of a single type of metal or mixed metal, or the particles can be used in combination. From the aspect of storage stability of the metallic particles, gold, silver, or copper particles are desirably used.

In the above-described exemplary embodiments, processing in the application amount restriction 607 is performed based on the color signal including ink elements of five colors of (C, M, Y, K, P), but the excess amount can also be acquired from a color signal of (R, G, B, P). In this case, it is sufficient that an excess amount corresponding to a combination of values of the elements of (R, G, B, P) is prestored. The processing can be executed by using a look-up table for outputting the excess amount based on the input of (R, G, B, P). As the number of grid points of the look-up table is increased, the accuracy can be improved. Processing of preferentially reducing an application amount of an ink of specific color based on the excess amount can be performed similarly to the processing in the above-described exemplary embodiments.

In the above-described exemplary embodiments, subtractive color inks of four colors of C, M, Y, and K are used as inks of basic colors, but the number of ink colors is not limited thereto.

In the above-described exemplary embodiments, the description has been provided of the example in which each processing procedure is executed by the CPU of the image processing unit main control unit 411, but part of the processing may be executed by the CPU of the recording unit main control unit 403. In addition, a program is read from a storage medium storing the program of each processing procedure and executed by a computer.

According to the exemplary embodiments of the present disclosure, since the application amount of the ink of specific color is preferentially reduced, it is possible to prevent overflowing of ink while suppressing a change in color balance in a recorded mage.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-019161, filed Feb. 9, 2021, which is hereby incorporated by reference herein in its entirety.

What is claimed is:

1. An image processing apparatus comprising:
an acquisition unit configured to acquire a color signal including a plurality of elements indicating application amounts of inks of a plurality of colors, the inks including at least one ink of a basic color and a fluorescent ink containing dispersion having a fluorescent property, to record an image by applying the inks of the plurality of colors to a recording medium;
a determination unit configured to determine whether a total value of the plurality of elements included in the color signal is larger than a threshold value; and
a reduction unit configured to reduce a value of at least one element of the plurality of elements included in the color signal in such a manner that the total value obtained after reduction becomes smaller than the total value obtained before the reduction in a case where the total value is determined to be larger than the threshold value,
wherein, in reduction processing performed by the reduction unit, an amount by which a value of an element corresponding to the fluorescent ink is reduced is largest among amounts by which respective values of the plurality of elements included in the color signal are reduced.

2. The image processing apparatus according to claim 1, wherein the reduction unit does not reduce a value of an element corresponding to the ink of the basic color.

3. The image processing apparatus according to claim 1, wherein the determination unit sets the threshold value based on at least one of type information indicating a type of recording medium on which the image is to be recorded and quality information indicating a recording quality of the image.

4. The image processing apparatus according to claim 1, wherein the ink of the basic color is an ink that absorbs light in a predetermined specific wavelength and contains a color material not emitting light.

5. The image processing apparatus according to claim 1, wherein the inks of the plurality of colors include cyan ink, magenta ink, and yellow ink as inks of basic colors.

6. The image processing apparatus according to claim 5, wherein the inks of the plurality of colors further include black ink.

7. The image processing apparatus according to claim 5, wherein the inks of the plurality of colors further include at least one of light cyan ink or light magenta ink.

8. The image processing apparatus according to claim 1, wherein the acquisition unit acquires a color signal including an element indicating an application amount of the at least one ink of the basic color and a color signal including an element indicating an application amount of the fluorescent ink.

9. The image processing apparatus according to claim 8, further comprising a color separation unit configured to generate a color signal including the element indicating the application amount of the at least one ink of the basic color and not including the element indicating the application amount of the fluorescent ink, and input the generated color signal to the acquisition unit.

10. The image processing apparatus according to claim 9, wherein a total value of elements included in the color signal generated by the color separation unit is smaller than or equal to the threshold value.

11. The image processing apparatus according to claim 9, wherein the determination unit calculates, as the total value, a total of the element included in the color signal generated by the color separation unit and the element of the fluorescent ink.

12. The image processing apparatus according to claim 1, wherein the acquisition unit acquires the color signal for each pixel corresponding to a unit region on a recording medium, and
wherein determination processing by the determination unit and reduction processing by the reduction unit are performed for each pixel for which the color signal has been acquired.

13. The image processing apparatus according to claim 1, wherein the inks of the plurality of colors further include a second fluorescent ink having a different color from the fluorescent ink, and
wherein, in the reduction processing performed by the reduction unit, an amount by which a value of an element corresponding to the second fluorescent ink is reduced is larger than an amount by which a value of an element corresponding to the ink of the basic color is reduced.

14. The image processing apparatus according to claim 1, further comprising a recording unit configured to apply the inks of the plurality of colors to the recording medium.

15. An image processing method comprising:
acquiring a color signal including a plurality of elements indicating application amounts of inks of a plurality of colors, the inks including at least one ink of a basic color and a fluorescent ink containing dispersion having a fluorescent property, to record an image by applying the inks of the plurality of colors to a recording medium;
determining whether a total value of the plurality of elements included in the color signal is larger than a threshold value; and
reducing a value of at least one element of the plurality of elements included in the color signal in such a manner that the total value obtained after reduction becomes smaller than the total value obtained before the reduction in a case where the total value is determined to be larger than the threshold value,
wherein, in reduction processing in the reducing, an amount by which a value of an element corresponding to the fluorescent ink is reduced is largest among amounts by which respective values of the plurality of elements included in the color signal are reduced.

16. A non-transitory computer-readable storage medium storing a program for causing a computer to execute the image processing method according to claim 15.

17. An image processing apparatus comprising:
an acquisition unit configured to acquire a color signal including a plurality of elements indicating application amounts of inks of a plurality of colors, the inks including at least one ink of a basic color and a metallic ink containing metallic particles, to record an image by applying the inks of the plurality of colors to a recording medium;

a determination unit configured to determine whether a total value of the plurality of elements included in the color signal is larger than a threshold value; and a reduction unit configured to reduce a value of at least one element of the plurality of elements included in the color signal in such a manner that the total value obtained after reduction becomes smaller than the total value obtained before the reduction in a case where the total value is determined to be larger than the threshold value, wherein, in reduction processing performed by the reduction unit, an amount by which a value of an element corresponding to the metallic ink is reduced is largest among amounts by which respective values of the plurality of elements included in the color signal are reduced.

18. An image processing method comprising:

acquiring a color signal including a plurality of elements indicating application amounts of inks of a plurality of colors, the inks including at least one ink of a basic color, and a metallic ink containing metallic particles, to record an image by applying the inks of the plurality of colors to a recording medium;

determining whether a total value of the plurality of elements included in the color signal is larger than a threshold value; and reducing a value of at least one element of the plurality of elements included in the color signal in such a manner that the total value obtained after reduction becomes smaller than the total value obtained before the reduction in a case where the total value is determined to be larger than the threshold value, wherein, in reduction processing in the reducing, an amount by which a value of an element corresponding to the metallic ink is reduced is largest among amounts by which respective values of the plurality of elements included in the color signal are reduced.

19. An image processing apparatus comprising:

an acquisition unit configured to acquire a color signal including a plurality of elements indicating application amounts of inks of a plurality of colors, the inks including at least one ink of a basic color and a fluorescent ink containing dispersion having a fluorescent property, to record an image by applying the inks of the plurality of colors to a recording medium;

a determination unit configured to determine whether a total value of the plurality of elements included in the color signal is larger than a threshold value; and a reduction unit configured to reduce a value of at least one element of the plurality of elements included in the color signal, in such a manner that the total value obtained after reduction becomes smaller than the total value obtained before the reduction, in a case where the total value is determined to be larger than the threshold value, wherein the reduction unit preferentially reduces a value of an element corresponding to the fluorescent ink among values of the plurality of elements included in the color signal.

20. An image processing apparatus comprising:

an acquisition unit configured to acquire a first color signal including N element(s) indicating an application amount for applying N (N≥1) ink(s) of a basic color and a second color signal including M element(s) indicating an application amount for applying M (M≥1)ink(s) of a specific color;

a determination unit configured to determine whether a total value of a value of the N element(s) included in the first color signal and a value of the M element(s) included in the second color signal is larger than a threshold value; and a reduction unit configured to reduce a value of at least one element of a plurality of elements included in the first and second color signals in such a manner that the total value obtained after reduction becomes smaller than the total value obtained before the reduction in a case where the total value is determined to be larger than the threshold value, wherein an element reduced by the reduction unit by a largest amount, among the N element(s) included in the first color signal and the M element(s) included in the second color signal, is one of the M element(s).

* * * * *